US010156282B2

(12) United States Patent
Lee et al.

(10) Patent No.: US 10,156,282 B2
(45) Date of Patent: Dec. 18, 2018

(54) POWER TRANSMISSION APPARATUS FOR VEHICLE

(71) Applicant: Hyundai Motor Company, Seoul (KR)

(72) Inventors: Sueng Ho Lee, Seoul (KR); Ki Tae Kim, Incheon (KR); Ki Dong Kim, Anyang-si (KR); Jihun Lee, Seongnam-si (KR); Ma Ru Kang, Yongin-si (KR); Seongwook Ji, Gunpo-si (KR); Chon Ok Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 268 days.

(21) Appl. No.: 15/265,116

(22) Filed: Sep. 14, 2016

(65) Prior Publication Data

US 2017/0122410 A1    May 4, 2017

(30) Foreign Application Priority Data

Oct. 29, 2015    (KR) ........................ 10-2015-0151325

(51) Int. Cl.
*F16H 3/08*          (2006.01)
*F16H 3/085*         (2006.01)
(Continued)

(52) U.S. Cl.
CPC ............ *F16H 3/085* (2013.01); *F16H 3/006* (2013.01); *F16H 2003/0826* (2013.01); *F16H 2003/0931* (2013.01); *F16H 2200/006* (2013.01)

(58) Field of Classification Search
CPC .......... F16H 37/021; F16H 2003/0931; F16H 2003/007; F16H 2003/008
(Continued)

(56) References Cited

U.S. PATENT DOCUMENTS 3,589,483 A *    6/1971   Smith ...................... F16H 3/097
                                                      192/3.52
6,874,381 B2 *   4/2005   Berger .................... F16H 61/28
                                                      74/329
(Continued)

FOREIGN PATENT DOCUMENTS

JP    2004-239441 A    8/2004
JP    2004-263708 A    9/2004
(Continued)

*Primary Examiner* — Ha Dinh Ho
(74) *Attorney, Agent, or Firm* — Morgan, Lewis & Bockius LLP (57) ABSTRACT

A power transmission apparatus for a vehicle may include a first input shaft on which at least one input gear is disposed, a second input shaft on which at least one other input gear is disposed, a first shifting output device including at least one shifting gear and a first output shaft, the at least one shifting gear being selectively synchronized with the first output shaft such that torque input from the first and second input shafts is output to a final drive gear, a second shifting output device including at least one other shifting gear and a second output shaft, the at least one other shifting gear being selectively synchronized with the second output shaft such that the torque input from the first and second input shafts is output to the final drive gear, and an idle device including an idle shaft and at least three idle gears.

13 Claims, 4 Drawing Sheets

(51) Int. Cl.
*F16H 3/00* (2006.01)
*F16H 3/093* (2006.01)

(58) Field of Classification Search
USPC .................................. 74/330, 331, 333, 340
See application file for complete search history.

(56) References Cited

U.S. PATENT DOCUMENTS

| | | | | |
|---|---|---|---|---|
| 7,044,013 | B2 * | 5/2006 | Ahrens | F16H 3/006 74/331 |
| 7,383,749 | B2 | 6/2008 | Schafer et al. | |
| 9,605,731 | B2 * | 3/2017 | Lee | F16H 3/093 |
| 2007/0199393 | A1 * | 8/2007 | Hattori | F16H 3/006 74/331 |
| 2007/0266810 | A1 * | 11/2007 | Forsyth | F16H 3/006 74/331 |

FOREIGN PATENT DOCUMENTS

| | | |
|---|---|---|
| JP | 4566199 B2 | 8/2010 |
| KR | 10-1063506 B1 | 9/2011 |
| KR | 10-1416405 B1 | 7/2014 |

\* cited by examiner

| shift-stage | CL1 | CL2 | SL1 1st | SL1 N | SL1 3rd | SL1 2nd | SL2 6th | SL2 N | SL2 5th | SL3 7th | SL3 N | SL4 8th | SL4 N | SL4 Rev. | SL5 N | SL5 4th |
|---|---|---|---|---|---|---|---|---|---|---|---|---|---|---|---|---|
| reverse speed | | △ | ● | | | | | ○ | | | ○ | | ○ | ● | | |
| N | | | | ○ | | | | ○ | | | ○ | | ○ | | ○ | |
| 1st speed | △ | | ● | | | | | ○ | | | ○ | | ○ | | ○ | |
| 2nd speed | | △ | | ○ | | ● | | ○ | | | ○ | | ○ | | ○ | |
| 3rd speed | △ | | | | ● | | | | | | | | ○ | | ○ | |
| fourth speed | | △ | | ○ | | | | ○ | | | ○ | | ○ | | ○ | |
| fifth speed | △ | | | ○ | | | | ○ | ● | | ○ | | ○ | | | |
| sixth speed | | △ | | ○ | | | ● | | | | ○ | | ○ | | ○ | |
| seventh speed | △ | | | ○ | | | | ○ | | ● | | | ○ | | ○ | |
| eighth speed | | △ | | ○ | | | | ○ | | | ○ | ● | | | ○ | |

△ : clutch operated    ● : shifting position    ○ : neutral position

POWER TRANSMISSION APPARATUS FOR VEHICLE

CROSS-REFERENCE TO RELATED APPLICATION

The present application claims priority to Korean Patent Application No. 10-2015-0151325, filed Oct. 29, 2015, the entire contents of which is incorporated herein for all purposes by this reference.

BACKGROUND OF THE INVENTION

Field of the Invention

The present invention relates to a power transmission apparatus for a vehicle utilizing a double clutch. More particularly, the present invention relates to a power transmission apparatus for a vehicle minimizing its length by disposing a synchronizer for the reverse speed on a separate idle shaft.

Description of Related Art

An environmentally-friendly technology of a vehicle is a core technology which controls survival of a future automobile industry, and advanced car makers have focused their energy on the development of an environmentally-friendly vehicle to achieve environmental and fuel efficiency regulations.

An electric vehicle (EV) or a hybrid electric vehicle (HEV) utilizing electrical energy, a double clutch transmission (DCT) simultaneously enhancing efficiency and convenience, etc., may be examples of such future automotive technology.

The double clutch transmission (DCT) includes two clutch devices and a gear train of a basically manual transmission, selectively transmits a torque input from an engine to two input shafts by using the two clutch devices, and outputs a torque shifted by the gear train.

Such a double clutch transmission (DCT) attempts to compactly realize a multi-stage transmission of more than five speeds. The DCT achieves an automated manual transmission (AMT) that removes necessity of a manual shifting of a driver, by controlling two clutches and synchronizing devices by a controller.

In comparison with an automatic transmission using planetary gears, such a DCT shows merits, such as higher efficiency in power delivery, easier modification in revising or adding parts in order to achieve more shift-stages, etc., and thus gathers more spotlight since it can more comfortably conform with fuel consumption regulation and efficiency in achieving more shift-stages In order to achieve more shift-stages of a DCT, the number of gears and synchronizing devices may be increased, which results in a drawback of increase in length and weight.

In particular, in the case of applying a DCT to a hybrid vehicle, a drive motor should be additionally installed in a space where an engine and the DCT is installed, and thus minimization in length is regarded as an important factor for the DCT to be well adopted to a hybrid vehicle and to comfortably achieve more shift-stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of shortened length, thereby improved installability, and minimizing increase in weight and the number of parts for more shift stages.

According to various aspects of the present invention, a power transmission apparatus for a vehicle may include a first input shaft comprising a solid shaft on which at least one input gear is disposed, the first input shaft being selectively connectable with an output side of a power source by a first clutch, a second input shaft comprising a hollow shaft on which at least one other input gear is disposed, the second input shaft surrounding the first input shaft at a forward portion of the first input shaft without interference, the second input shaft being selectively connectable with the output side of the power source by a second clutch, a first shifting output device including at least one shifting gear and a first output shaft, the first output shaft being disposed parallel to the first and second input shafts, the at least one shifting gear being rotatably disposed on the first output shaft and continuously engaged with the at least one input gear or the at least one other input gear, and the at least one shifting gear being selectively synchronized with the first output shaft such that torque input from the first and second input shafts is shifted and output to a final drive gear, a second shifting output device including at least one other shifting gear and a second output shaft, the second output shaft being disposed parallel to the first and second input shafts, the at least one other shifting gear being rotatably disposed on the second output shaft and continuously engaged with the at least one input gear or the at least one other input gear, and the at least one other shifting gear being selectively synchronized with the second output shaft such that the torque input from the first and second input shafts is shifted and output to the final drive gear, and an idle device including an idle shaft and at least three idle gears disposed on the idle shaft, the idle shaft being disposed parallel to the first and second input shafts, a first idle gear of the three idle gears being fixed to the idle shaft and engaged with one of the at least one shifting gear and the at least one other shifting gear of the first and second output shafts, a second idle gear of the three idle gears being engaged with one of the at least one input gear and the at least one other input gear and selectively synchronized with the idle shaft, and a third idle gear of the three idle gears engaged with a shifting gear fixed to one of the first and second output shafts and selectively synchronized with the idle shaft.

First, second, third, and fourth input gears may be sequentially disposed on the first input shaft at positions not overlapping with the second input shaft, fifth and sixth input gears may be disposed on the second input shaft, the first input gear may be an input gear to realize a forward seventh speed, the second input gear may be an input gear to realize a forward first speed, the third input gear may be an input gear to realize a forward fifth speed, the fourth input gear may be an input gear to realize a forward third speed, the fifth input gear may be an input gear to realize a forward second speed and a reverse speed, and the sixth input gear may be an input gear to realize a forward eighth speed.

The first shifting output device may include the first output shaft disposed parallel to the first and second input shafts, a forward first speed shifting gear and a forward third speed shifting gear disposed on the first output shaft, a first synchronizer selectively synchronizing the forward first speed shifting gear and the forward third speed shifting gear to the first output shaft, a forward second speed shifting gear and a forward sixth speed shifting gear disposed on the first output shaft, a second synchronizer selectively synchronizing the forward second speed shifting gear and the forward sixth speed shifting gear to the first output shaft, a first output gear fixed to the first output shaft, and a forward fourth speed shifting gear fixed to the first output shaft, and the second shifting output device may include the second output shaft disposed parallel to the first and second input shafts, a forward fifth speed shifting gear and a forward seventh speed shifting gear disposed on the second output shaft, a third synchronizer selectively synchronizing the forward fifth speed shifting gear and the forward seventh speed shifting gear to the second output shaft, a forward eighth speed shifting gear disposed on the second output shaft, a fourth synchronizer selectively synchronizing the forward eighth speed shifting gear to the second output shaft, and a second output gear fixed to the second output shaft.

In the first shifting output device, the forward first speed shifting gear may be engaged with the second input gear, the forward third speed shifting gear may be engaged with the fourth input gear, the forward second speed shifting gear may be engaged with the fifth input gear, and the forward sixth speed shifting gear may be engaged with the sixth input gear, and in the second shifting output device, the forward fifth speed shifting gear may be engaged with the third input gear, the forward seventh speed shifting gear may be engaged with the first input gear, and the forward eighth speed input gear may be engaged with the sixth input gear.

The idle device may include the idle shaft disposed parallel to the first and second input shafts, an idle input gear fixed to the idle shaft and engaged with one of the at least one other shifting gear on the second output shaft, a reverse speed idle gear rotatably disposed on the idle shaft and engaged with one of the at least one shifting gear on the first input shaft, a forward speed idle gear rotatably disposed on the idle shaft and engaged with a shifting gear fixed to the first output shaft, and a fifth synchronizer selectively synchronizing the reverse speed idle gear and forward speed idle gear to the idle shaft.

The idle input gear may be engaged with a forward second speed shifting gear on the first output shaft, the reverse speed idle gear may be engaged with the first input gear on the first input shaft, and the forward speed idle gear may be engaged with a forward fourth speed shifting gear fixed to the first output shaft.

A reverse speed may be realized by synchronizing the reverse speed idle gear and the idle shaft by an operation of the fifth synchronizer and by synchronizing a forward first speed shifting gear and the first output shaft by an operation of a first synchronizer.

According to various aspects of the present invention, a power transmission apparatus for a vehicle realizing eight forward speeds and one reverse speed may include a first input shaft being a solid shaft on which first, second, third, and fourth input gears may be sequentially disposed, the first input shaft being selectively connectable with an output side of a power source by a first clutch, a second input shaft being a hollow shaft on which fifth and sixth input gears are disposed, the second input shaft surrounding the first input shaft at a forward portion of the first input shaft without interference and selectively connectable with the output side of the power source by a second clutch, a first shifting output device including a first output shaft disposed parallel to the first and second input shafts, a forward first speed shifting gear and a forward third speed shifting gear disposed on the first output shaft, a first synchronizer selectively synchronizing the forward first speed shifting gear and the forward third speed shifting gear to the first output shaft, a forward second speed shifting gear and a forward sixth speed shifting gear disposed on the first output shaft, a second synchronizer selectively synchronizing the forward second speed shifting gear and the forward sixth speed shifting gear to the first output shaft, a first output gear fixed to the first output shaft, and a forward fourth speed shifting gear fixed to the first output shaft, a second shifting output device including a second output shaft disposed parallel to the first and second input shafts, a forward fifth speed shifting gear and a forward seventh speed shifting gear disposed on the second output shaft, a third synchronizer selectively synchronizing the forward fifth speed shifting gear and the forward seventh speed shifting gear to the second output shaft, a forward eighth speed shifting gear disposed on the second output shaft, a fourth synchronizer selectively synchronizing the forward eighth speed shifting gear to the second output shaft, and a second output gear fixed to the second output shaft, and an idle device disposed parallel to the first and second input shafts and transmitting a torque transmitted from the second shifting gear directly to the first output shaft or to the second output shaft through the first input shaft.

The idle device may include an idle shaft disposed parallel to the first and second input shafts, an idle input gear fixed to the idle shaft and engaged with one of shifting gears on the second output shaft, a reverse speed idle gear rotatably disposed on the idle shaft and engaged with one of the input gears on the first input shaft, a forward speed idle gear rotatably disposed on the idle shaft and engaged with the forward fourth speed shifting gear fixed to the first output shaft, and a fifth synchronizer selectively synchronizing the reverse speed idle gear and the forward speed idle gear to the idle shaft.

The first input gear may be engaged with the forward seventh speed shifting gear and the reverse speed idle gear, the second input gear may be engaged with the forward first speed shifting gear, the third input gear may be engaged with the forward fifth speed shifting gear, the fourth input gear may be engaged with the forward third speed shifting gear, the fifth input gear may be engaged with the forward second speed shifting gear, and the sixth input gear may be engaged with the forward sixth speed and the forward eighth speed shifting gears.

A power transmission apparatus for a vehicle according to various embodiments of the present invention realizes eight forward speeds and one reverse speed by disposing one synchronizer and relevant gears in connection with the reverse speed and the forward fourth speed on an idle shaft. By such an arrangement, total number of parts may be minimized, and thereby an overall length of a power transmission apparatus may be minimized.

In addition, production cost may be decreased by minimizing the increase in weight and the number of parts, and installability may be enhanced by the reduced length of a power transmission apparatus.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
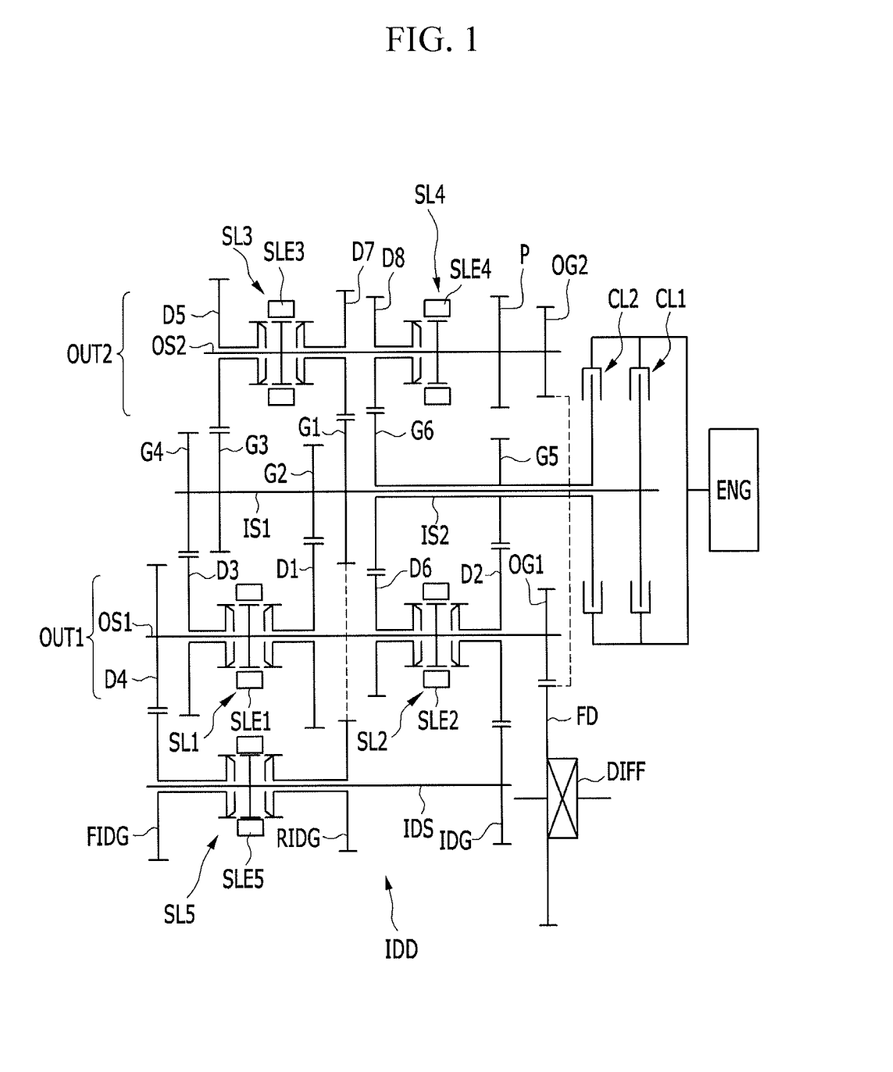
FIG. 1 is a gear layout view of a power transmission apparatus for a vehicle according to various embodiments of the present invention.

FIG. 1 is a gear layout view of a power transmission apparatus for a vehicle according to various embodiments of the present invention.

Referring to FIG. 1, a power transmission apparatus according to various embodiments of the present invention includes a clutching device, an input device, a shifting output device, and an idle device IDD. The clutching device includes first and second clutches CL1 and CL2, and connects or disconnects power transmission from a power source, e.g., an engine or a motor, ENG. The input device includes first and second input shafts IS1 and IS2. The shifting output device includes first and second shifting output devices OUT1 and OUT2 that respectively receives a torque from the input device through the first and second input shafts IS1 and IS2, and outputs a shifted torque after shifting the input torque. The idle device IDD is disposed adjacent to the shifting output device.

The power source ENG may be an engine in the case of a manual or automatic transmission vehicle that utilizes a conventional internal combustion engine, and may be a motor in the case of a hybrid vehicle that utilizes a motor as a source of a driving power of the vehicle.

The first and second clutches CL1 and CL2 in the clutching device receives the torque of the power source ENG, and selectively transmits the received torque to the first and second input shafts IS1 and IS2.

The first clutch C1 selectively transmits the torque of the power source ENG to the first input shaft IS1, and the second clutch CL2 selectively transmits the torque of the power source ENG to the second input shaft IS2.

The first and second clutches CL1 and CL2 may be realized as conventional multi-plate wet clutches, but are not limited thereto, since they may also be realized as multi-plate dry clutches. The first and second clutches CL1 and CL2 may be operated by a control of a hydraulic control system.

The first input shaft IS1 in the input device is selectively connectable with an output side of the power source ENG by the first clutch CL1

The second input shaft IS2 is in a form of a hollow shaft disposed exterior to and concentrically with the first input shaft IS1 such that the first and second input shafts IS1 and IS2 may rotate without interference. Such second input shaft IS2 is selectively connectable with the output side of the power source through the second clutch CL2.

First, second, third, and fourth input gears G1, G2, G3, and G4 are fixed to the first input shaft IS1 with predetermined spacing between the four input gears G1 to G4. The four gears G1 to G4 are disposed rearward on first input shaft IS1, i.e., at a downstream side of the second input shaft IS2, and they are sequentially disposed in an order of the first, second, third, and fourth input gears G1, G2, G3, and G4, in a direction from front to rear of the first input shaft IS1.

Fifth and sixth input gears G5 and G6 are fixed to the second input shaft IS2 with predetermined spacing therebetween. The fifth input gear G5 is disposed forward and the sixth input gear G6 is disposed rearward, with respect to each other.

When the first clutch CL1 is operated, the first input shaft IS1 is forced to rotate, and thus the first, second, third, and fourth input gears G1, G2, G3, and G4 are forcedly rotated. When the second clutch CL2 is operated, the second input shaft IS2 is forced to rotate, and thus the fifth and sixth input gears G5 and G6 are forcedly rotated.

The first, second, third, fourth, fifth, and sixth input gears G1, G2, G3, G4, G5, and G6 respectively act as an input gear for respective shift-stages. The first input gear G1 acts as an input gear for realizing the forward seventh speed. The second input gear G2 acts as an input gear for realizing the forward first speed. The third input gear G3 acts as an input gear for realizing the forward fifth speed. The fourth input gear G4 acts as an input gear for realizing the forward third speed.

The fifth input gear G5 acts as an input gear for realizing the forward second speed, the forward fourth speed, and the reverse speed. The sixth input gear G6 acts as an input gear for realizing the forward sixth speed and the forward eighth speed.

The input gears G1, G2, G3, G4, G5, and G6 may have gear teeth in appropriate numbers for realizing respective shift-stages. The input gears G1, G2, G3, and G4 on the first input shaft IS1 realize odd-numbered shift-stages, and the input gears G5 and G6 on the second input shaft IS2 realize even-numbered shift-stages.

The first and second shifting output devices OUT1 and OUT2 in the shifting output device are disposed parallel to the first and second input shafts IS1 and IS2.

The first shifting output device OUT1 includes a first output shaft OS1 disposed parallel to the first and second input shafts IS1 and IS2, first and second synchronizers SL1 and SL2 disposed on the first output shaft OS1, and a first output gear OG1.

The first synchronizer SL1 includes a forward first speed shifting gear D1 and a forward third speed shifting gear D3 rotatably disposed on the first output shaft OS1, and selectively synchronizes the forward first speed shifting gear D1 and the forward third speed shifting gear D3 with the first output shaft OS1. The second synchronizer SL2 includes a forward second speed shifting gear D2 and a forward sixth speed shifting gear D6 rotatably disposed on the first output shaft OS1, and selectively synchronizes the forward second speed shifting gear D2 and the forward sixth speed shifting gear D6 with the first output shaft OS1.

The first output gear OG1 is disposed foremost on the first output shaft OS1.

The first synchronizer SL1 is disposed rearward at the first output shaft OS1, the forward first speed shifting gear D1 is externally engaged with the second input gear G2, and the forward third speed shifting gear D3 is externally engaged with the fourth input gear G4.

The second synchronizer SL2 is disposed forward on the first output shaft OS1, the forward second speed shifting gear D2 is externally engaged with the fifth input gear G5, and the forward sixth speed shifting gear D6 is externally engaged with the sixth input gear G6.

The first output gear OG1 outputs the torque received through the first output shaft OS1 to a differential DIFF through a final drive gear FD.

The second shifting output device OUT2 includes a second output shaft OS2 disposed parallel to the first and second input shafts IS1 and IS2, third and fourth synchronizers SL3 and SL4 disposed on the second output shaft OS2, and a second output gear OG2.

The third synchronizer SL3 includes a forward fifth speed shifting gear D5 and a forward seventh speed shifting gear D7 rotatably disposed on the second output shaft OS2, and selectively synchronizes the forward fifth speed shifting gear D5 and the forward seventh speed shifting gear D7 with the second output shaft OS2. The fourth synchronizer SL4 includes a forward eighth speed shifting gear D8 rotatably disposed on the second output shaft OS2, and selectively synchronizes the forward eighth speed shifting gear D8 with the second output shaft OS2.

The second output gear OG2 is disposed foremost on the second output shaft OS2.

The third synchronizer SL3 is disposed rearward on the second output shaft OS2, the forward fifth speed shifting gear D5 is externally engaged with the third input gear G3, and the forward seventh speed shifting gear D7 is externally engaged with the first input gear G1.

The fourth synchronizer SL4 is disposed forward on the second output shaft OS2, and the forward eighth speed shifting gear D8 is externally engaged with the sixth input gear G6.

The second output gear OG2 outputs the torque received through the second output shaft OS2 to the differential DIFF through the final drive gear FD.

The first output gear OG1 and the second output gear OG2 are externally engage with the final drive gear FD, and final reduction occurs therebetween. The torque having passed through the final drive gear FD is transmitted to drive wheels of a vehicle through the differential DIFF.

The first shifting output device OUT1 includes a forward fourth speed shifting gear D4 fixed rearmost to the first output shaft OS1.

The idle device IDD includes an idle shaft IDS disposed parallel to the first and second input shafts IS1 and IS2.

An idle input gear IDG and a fifth synchronizer SL5 are provided on the idle shaft IDS.

The idle input gear IDG is fixed to the idle shaft IDG, and externally engaged with the forward second speed shifting gear D2. The fifth synchronizer SL5 includes a forward speed idle gear FIDG and a reverse speed idle gear RIDG, where the forward speed idle gear FIDG is rotatably disposed on the idle shaft IDS. The fifth synchronizer SL5 selectively synchronizes the forward speed idle gear FIDG and the reverse speed idle gear RIDG with the idle shaft IDS.

The forward speed idle gear FIDG is externally engaged with the forward fourth speed shifting gear D4 fixed to the first output shaft OS1, and the reverse speed idle gear RIDG is externally engaged with the first input gear G1.

Details of the first, second, third, fourth, and fifth synchronizers SL1 to SL5 are known in the art, and thus a further detailed description is omitted here. Respective sleeves SLE1, SLE2, SLE3, SLE4, and SLE5 operated with the first, second, third, fourth, and fifth synchronizers SL1 to SL5 may be operated by corresponding actuators under a control of a transmission control unit.

A reference symbol P in the drawings designates a parking gear.

Figure 2:
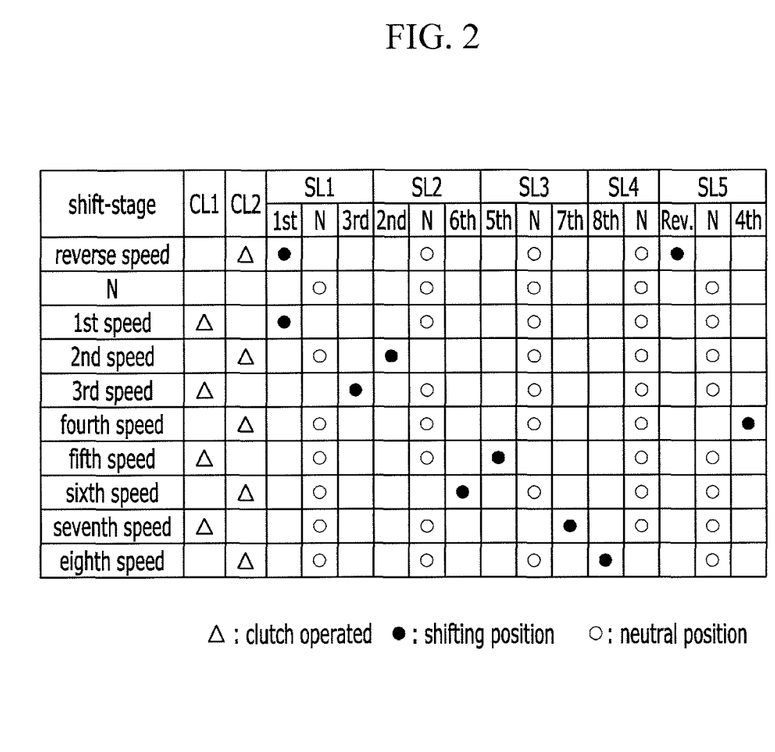
FIG. 2 is a shift operational chart for the power transmission apparatus for a vehicle according to various embodiments of the present invention.

FIG. 2 is a shift operational chart for a power transmission apparatus for a vehicle according to various embodiments of the present invention.

Hereinafter, operation of respective shift-stages of a power transmission apparatus for a vehicle according to various embodiments of the present invention will be described with reference to FIG. 2.

[The Forward First Speed]

For shifting to the forward first speed, the forward first speed shifting gear D1 and the first output shaft OS1 are synchronized by the sleeve SLE1 of the first synchronizer SL1, and then first clutch CL1 is operated. By such an operation, shifting to the forward first speed is realized.

[The Forward Second Speed]

For shifting from the forward first speed to the forward second speed, e.g., according to an increase of a vehicle speed, the forward second speed shifting gear D2 and first output shaft OS1 are synchronized by the sleeve SLE2 of the second synchronizer SL2, and then the second clutch CL2 is operated while releasing the first clutch CL1. By such an operation, shifting to the forward second speed is realized.

When the shifting to the forward second speed is finished, the sleeve SLE1 of the first synchronizer SL1 is moved to a neutral state.

[The Forward Third Speed]

For shifting from the forward second speed to the forward third speed, e.g., according to an increase of a vehicle speed, the forward third speed shifting gear D3 and first output shaft OS1 are synchronized by the sleeve SLE1 of the first synchronizer SL1, and then the first clutch CL1 is operated while releasing the second clutch CL2. By such an operation, shifting to the forward third speed is realized.

When the shifting to the forward third speed is finished, the sleeve SLE2 of the second synchronizer SL2 is moved to a neutral state.

[The Forward Fourth Speed]

For shifting from the forward third speed to the forward fourth speed, e.g., according to an increase of a vehicle speed, forward speed idle gear FIDG and idle shaft IDS are synchronized by the sleeve SLE5 of the fifth synchronizer SL5, and then the second clutch CL2 is operated while releasing the first clutch CL1. By such an operation, shifting to the forward fourth speed is realized.

When the shifting to the forward fourth speed is finished, the sleeve SLE1 of the first synchronizer SL1 is moved to a neutral state.

[The Forward Fifth Speed]

For shifting from the forward fourth speed to the forward fifth speed, e.g., according to an increase of a vehicle speed, the forward fifth speed shifting gear D5 and second output shaft OS2 are synchronized by the sleeve SLE3 of the third synchronizer SL3, and then the first clutch CL1 is operated while releasing the second clutch CL2. By such an operation, shifting to the forward fifth speed is realized.

When the shifting to the forward fifth speed is finished, the sleeve SLE5 of the fifth synchronizer SL5 is moved to a neutral state.

[The forward sixth speed]

For shifting from the forward fifth speed to the forward sixth speed, e.g., according to an increase of a vehicle speed, the forward sixth speed shifting gear D6 and first output shaft OS1 are synchronized by the sleeve SLE2 of the second synchronizer SL2, and then the second clutch CL2 is operated while releasing the first clutch CL1. By such an operation, shifting to the forward sixth speed is realized.

When the shifting to the forward sixth speed is finished, the sleeve SLE3 of the third synchronizer SL3 is moved to a neutral state.

[The Forward Seventh Speed]

For shifting from the forward sixth speed to the forward seventh speed, e.g., according to an increase of a vehicle speed, the forward seventh speed shifting gear D7 and second output shaft OS2 are synchronized by the sleeve SLE3 of the third synchronizer SL3, and then the first clutch CL1 is operated while releasing the second clutch CL2. By such an operation, shifting to the forward seventh speed is realized.

When the shifting to the forward seventh speed is finished, the sleeve SLE2 of the second synchronizer SL2 is moved to a neutral state.

[The Forward Eighth Speed]

For shifting from the forward seventh speed to the forward eighth speed, e.g., according to an increase of a vehicle speed, the forward eighth speed shifting gear D8 and second output shaft OS2 are synchronized by the sleeve SLE4 of the fourth synchronizer SL4, and then the second clutch CL2 is operated while releasing the first clutch CL1. By such an operation, shifting to the forward eighth speed is realized.

When the shifting to the forward eighth speed is finished, the sleeve SLE3 of the third synchronizer SL3 is moved to a neutral state.

[The Reverse Speed]

For shifting to the reverse speed, the reverse speed idle gear RIDG and the idle shaft IDS are synchronized by the sleeve SLE5 of the fifth synchronizer SL5, and simultaneously the forward first speed shifting gear D1 and the first output shaft OS1 are synchronized by the sleeve SLE1 of the first synchronizer SL1. At such a state, the second clutch CL2 is operated, and thereby, shifting to the reverse speed is realized.

Figure 3:
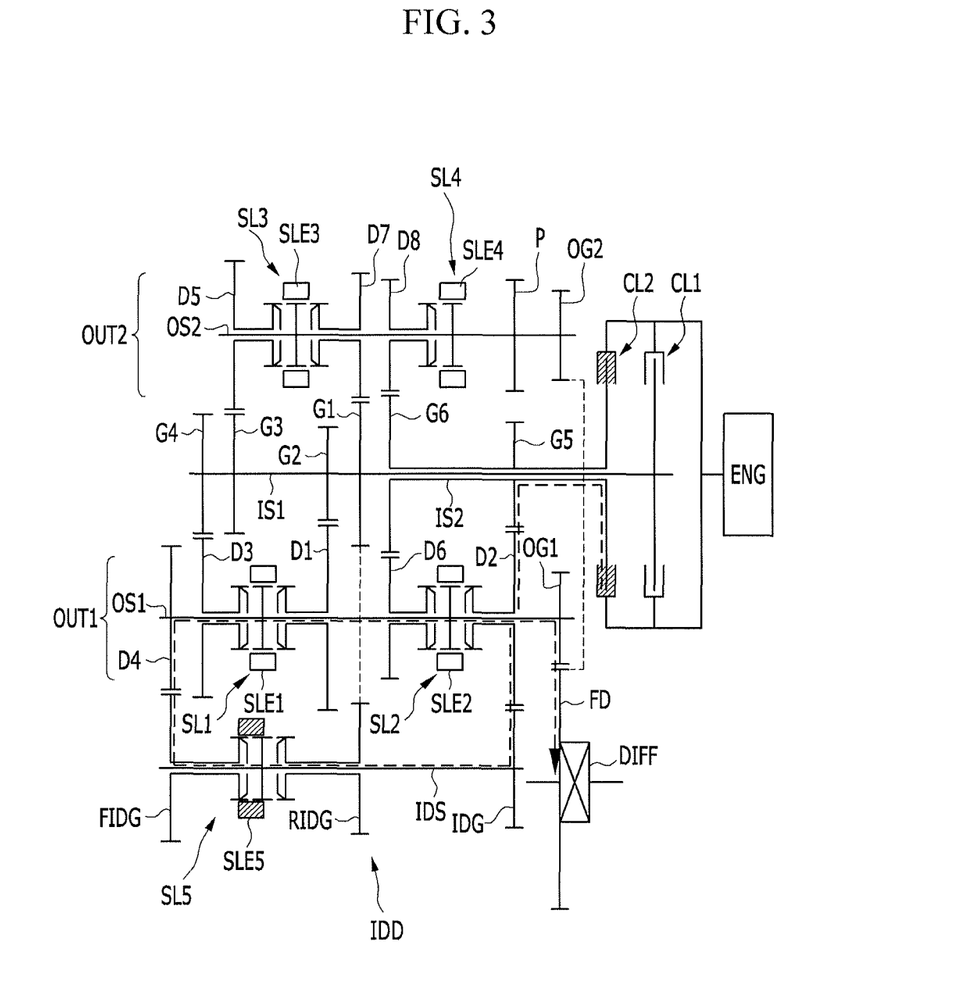
FIG. 3 illustrates a power delivery path diagram for the forward fourth speed of the power transmission apparatus for a vehicle according to various embodiments of the present invention.

FIG. 3 illustrates a power delivery path diagram for the forward fourth speed of a power transmission apparatus for a vehicle according to various embodiments of the present invention.

Referring to FIG. 2 and FIG. 3, for shifting to the forward fourth speed, the forward speed idle gear FIDG and the idle shaft IDS are synchronized by the sleeve SLE5 of the fifth synchronizer SL5, and the second clutch CL2 is operated.

In such a forward fourth speed, the torque of the power source ENG is transmitted through the second clutch CL2, the second input shaft IS2, the fifth input gear G5, the forward second speed shifting gear D2, the idle input gear IDG, the idle shaft IDS, the fifth synchronizer SL5, the forward speed idle gear FIDG, the forward fourth speed shifting gear D4, the first output shaft OS1, the first output gear OG1, the final drive gear FD, and the differential DIFF.

Figure 4:
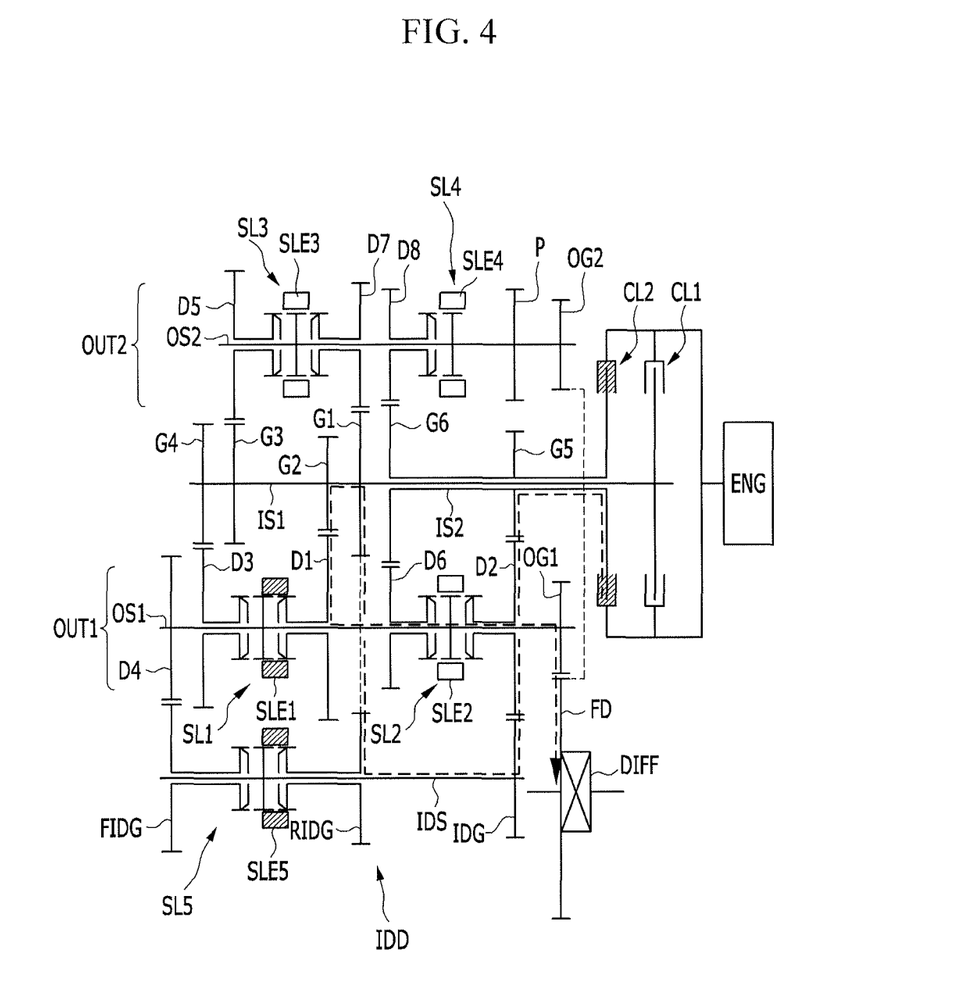
FIG. 4 illustrates a power delivery path diagram for a reverse speed of the power transmission apparatus for a vehicle according to various embodiments of the present invention.

FIG. 4 illustrates a power delivery path diagram for reverse speed of a power transmission apparatus for a vehicle according to various embodiments of the present invention.

Referring to FIG. 2 and FIG. 4, for shifting to the reverse speed, the reverse speed idle gear RIDG and the idle shaft IDS are synchronized by the sleeve SLE5 of the fifth synchronizer SL5, and at the same time, the forward first speed shifting gear D1 and the first output shaft OS1 are synchronized by the sleeve SLE1 of the first synchronizer SL1. In such a state, the second clutch CL2 is operated.

In such a reverse speed, the torque of the power source ENG is transmitted through the second clutch CL2, the second input shaft IS2, the fifth input gear G5, the forward second speed shifting gear D2, the idle input gear IDG, the idle shaft IDS, the fifth synchronizer SL5, the reverse speed idle gear RIDG, the first input gear G1, the first input shaft IS1, the second input gear G2, first shifting gear D1, the first synchronizer SL1, the first output shaft OS1, the first output gear OG1, the final drive gear FD, and the differential DIFF.

As described above, a power transmission apparatus for a vehicle according to various embodiments of the present invention realizes eight forward speeds and one reverse speed by disposing one synchronizer and relevant gears in connection with the reverse speed and the forward fourth speed on an idle shaft. By such an arrangement, total number of parts may be minimized, and thereby an overall length of a power transmission apparatus may be minimized.

In addition, production cost may be decreased by minimizing the increase in weight and the number of parts, and installability may be enhanced by the reduced length of a power transmission apparatus.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission apparatus for a vehicle, comprising:
   a first input shaft comprising a solid shaft on which at least one input gear is disposed, the first input shaft being selectively connectable with an output side of a power source by a first clutch;
   a second input shaft comprising a hollow shaft on which at least one other input gear is disposed, the second input shaft surrounding the first input shaft at a forward portion of the first input shaft without interference, the second input shaft being selectively connectable with the output side of the power source by a second clutch;
   a first shifting output device including at least one shifting gear and a first output shaft, the first output shaft being disposed parallel to the first and second input shafts, the at least one shifting gear being rotatably disposed on the first output shaft and continuously engaged with the at least one input gear or the at least one other input gear, and the at least one shifting gear being selectively synchronized with the first output shaft such that torque input from the first and second input shafts is shifted and output to a final drive gear;
   a second shifting output device including at least one other shifting gear and a second output shaft, the second output shaft being disposed parallel to the first and second input shafts, the at least one other shifting gear being rotatably disposed on the second output shaft and continuously engaged with the at least one input gear or the at least one other input gear, and the at least one other shifting gear being selectively synchronized with the second output shaft such that the torque input from the first and second input shafts is shifted and output to the final drive gear; and
   an idle device including an idle shaft and at least three idle gears disposed on the idle shaft, the idle shaft being disposed parallel to the first and second input shafts, a first idle gear of the three idle gears being fixed to the idle shaft and engaged with one of the at least one shifting gear and the at least one other shifting gear of the first and second output shafts, a second idle gear of the three idle gears being engaged with one of the at least one input gear and the at least one other input gear and selectively synchronized with the idle shaft, and a third idle gear of the three idle gears engaged with a shifting gear fixed to one of the first output shaft and the second output shaft and selectively synchronized with the idle shaft.

2. The power transmission apparatus of claim 1, wherein first, second, third, and fourth input gears are sequentially disposed on the first input shaft at positions not overlapping with the second input shaft;
   fifth and sixth input gears are disposed on the second input shaft;
   the first input gear comprises an input gear to realize a seventh forward speed;
   the second input gear comprises an input gear to realize a first forward speed;
   the third input gear comprises an input gear to realize a fifth forward speed;
   the fourth input gear comprises an input gear to realize a third forward speed;
   the fifth input gear comprises an input gear to realize a second forward speed and a reverse speed; and
   the sixth input gear comprises an input gear to realize an eighth forward speed.

3. The power transmission apparatus of claim 2, wherein the first shifting output device comprises the first output shaft disposed parallel to the first and second input shafts, a first forward speed shifting gear and a third forward speed shifting gear disposed on the first output shaft, a first synchronizer selectively synchronizing the first forward speed shifting gear and the third forward speed shifting gear to the first output shaft, a second forward speed shifting gear and a sixth forward speed shifting gear disposed on the first output shaft, a second synchronizer selectively synchronizing the second forward speed shifting gear and the sixth forward speed shifting gear to the first output shaft, a first output gear fixed to the first output shaft, and a fourth forward speed shifting gear fixed to the first output shaft; and
   the second shifting output device comprises the second output shaft disposed parallel to the first and second input shafts, a fifth forward speed shifting gear and a seventh forward speed shifting gear disposed on the second output shaft, a third synchronizer selectively synchronizing the fifth forward speed shifting gear and the seventh forward speed shifting gear to the second output shaft, an eighth forward speed shifting gear disposed on the second output shaft, a fourth synchronizer selectively synchronizing the forward eighth speed shifting gear to the second output shaft, and a second output gear fixed to the second output shaft.

4. The power transmission apparatus of claim 3, wherein
   in the first shifting output device, the first forward speed shifting gear is engaged with the second input gear, the third forward speed shifting gear is engaged with the fourth input gear, the second forward speed shifting gear is engaged with the fifth input gear, and the sixth forward speed shifting gear is engaged with the sixth input gear; and
   in the second shifting output device, the fifth forward speed shifting gear is engaged with the third input gear, the seventh forward speed shifting gear is engaged with the first input gear, and the forward eighth speed input gear is engaged with the sixth input gear.

5. The power transmission apparatus of claim 1, wherein the idle device comprises:
   the idle shaft disposed parallel to the first and second input shafts;
   an idle input gear fixed to the idle shaft and engaged with one of the at least one other shifting gear on the second output shaft;
   a reverse speed idle gear rotatably disposed on the idle shaft and engaged with one of the at least one shifting gear on the first input shaft;
   a forward speed idle gear rotatably disposed on the idle shaft and engaged with a shifting gear fixed to the first output shaft; and
   a fifth synchronizer selectively synchronizing the reverse speed idle gear and forward speed idle gear to the idle shaft.

6. The power transmission apparatus of claim 5, wherein the idle input gear is engaged with a second forward speed shifting gear on the first output shaft;
   the reverse speed idle gear is engaged with the first input gear on the first input shaft; and
   the forward speed idle gear is engaged with a fourth forward speed shifting gear fixed to the first output shaft.

7. The power transmission apparatus of claim 6, wherein a reverse speed is realized by synchronizing the reverse speed idle gear and the idle shaft by an operation of the fifth synchronizer and by synchronizing a first forward speed shifting gear and the first output shaft by an operation of a first synchronizer.

8. A power transmission apparatus for a vehicle realizing eight forward speeds and one reverse speed, comprising:
   a first input shaft comprising a solid shaft on which first, second, third, and fourth input gears are sequentially disposed, the first input shaft being selectively connectable with an output side of a power source by a first clutch;
   a second input shaft comprising a hollow shaft on which fifth and sixth input gears are disposed, the second input shaft surrounding the first input shaft at a forward portion of the first input shaft without interference and selectively connectable with the output side of the power source by a second clutch;
   a first shifting output device including a first output shaft disposed parallel to the first and second input shafts, a first forward speed shifting gear and a third forward speed shifting gear disposed on the first output shaft, a first synchronizer selectively synchronizing the first forward speed shifting gear and the third forward speed shifting gear to the first output shaft, a second forward speed shifting gear and a sixth forward speed shifting gear disposed on the first output shaft, a second synchronizer selectively synchronizing the second forward speed shifting gear and the sixth forward speed shifting gear to the first output shaft, a first output gear fixed to the first output shaft, and a fourth forward speed shifting gear fixed to the first output shaft;
   a second shifting output device including a second output shaft disposed parallel to the first and second input shafts, a fifth forward speed shifting gear and a seventh forward speed shifting gear disposed on the second output shaft, a third synchronizer selectively synchronizing the fifth forward speed shifting gear and the seventh forward speed shifting gear to the second output shaft, an eighth forward speed shifting gear disposed on the second output shaft, a fourth synchronizer selectively synchronizing the forward eighth speed shifting gear to the second output shaft, and a second output gear fixed to the second output shaft; and
   an idle device disposed parallel to the first and second input shafts and transmitting a torque transmitted from the second shifting gear directly to the first output shaft or to the second output shaft through the first input shaft.

9. The power transmission apparatus of claim 8, wherein the idle device comprises:
   an idle shaft disposed parallel to the first and second input shafts;
   an idle input gear fixed to the idle shaft and engaged with one of shifting gears on the second output shaft;
   a reverse speed idle gear rotatably disposed on the idle shaft and engaged with one of the input gears on the first input shaft;
   a forward speed idle gear rotatably disposed on the idle shaft and engaged with the fourth forward speed shifting gear fixed to the first output shaft; and
   a fifth synchronizer selectively synchronizing the reverse speed idle gear and the forward speed idle gear to the idle shaft.

10. The power transmission apparatus of claim 9, wherein
    the first input gear is engaged with the seventh forward speed shifting gear and the reverse speed idle gear;
    the second input gear is engaged with the first forward speed shifting gear;
    the third input gear is engaged with the fifth forward speed shifting gear;
    the fourth input gear is engaged with the third forward speed shifting gear;
    the fifth input gear is engaged with the second forward speed shifting gear; and
    the sixth input gear is engaged with the sixth forward speed and the forward eighth speed shifting gears.

11. The power transmission apparatus of claim 9, wherein
    in the first shifting output device, the first forward speed shifting gear is engaged with the second input gear, the third forward speed shifting gear is engaged with the fourth input gear, the second forward speed shifting gear is engaged with the fifth input gear, and the sixth forward speed shifting gear is engaged with the sixth input gear; and
    in the second shifting output device, the fifth forward speed shifting gear is engaged with the third input gear, the seventh forward speed shifting gear is engaged with the first input gear, and the forward eighth speed input gear is engaged with the sixth input gear.

12. The power transmission apparatus of claim 9, wherein
    the idle input gear is engaged with the second forward speed shifting gear on the first output shaft;
    the reverse speed idle gear is engaged with the first input gear on the first input shaft; and
    the forward speed idle gear is engaged with the fourth forward speed shifting gear fixed to the first output shaft.

13. The power transmission apparatus of claim 11, wherein the reverse speed is realized by synchronizing the reverse speed idle gear and the idle shaft by an operation of the fifth synchronizer, and synchronizing the first forward speed shifting gear and the first output shaft by an operation of the first synchronizer.

* * * * *